Nov. 17, 1953

E. H. LAND 2,659,825

RADIATION DETECTION DEVICE

Filed Sept. 29, 1949

INVENTOR
Edwin H. Land
BY Donald L. Brown
Attorney

Patented Nov. 17, 1953 2,659,825

UNITED STATES PATENT OFFICE 2,659,825

RADIATION DETECTION DEVICE

Edwin H. Land, Cambridge, Mass., assignor to Polaroid Corporation, Cambridge, Mass., a corporation of Delaware Application September 29, 1949, Serial No. 118,597

3 Claims. (Cl. 250—68)

This invention relates to radiation-sensitive devices, and more particularly to composite structures responsive to predetermined nonvisible radiation and capable of indicating the presence of such radiation.

One object of the present invention is to provide a radiation-sensitive device small enough to be carried, for example, as a badge or in a pocket, and capable of giving a prompt indication, when desired, of the extent of its exposure to predetermined nuclear radiation.

A further object is to provide a suitable mounting means for a film unit of the type which is capable of being processed merely by the application of mechanical stress, said mounting means including mechanism for supporting the film unit in position for readily intercepting radiation to which it is sensitive and for applying to the unit the stress required for effecting its processing.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

Figure 1:
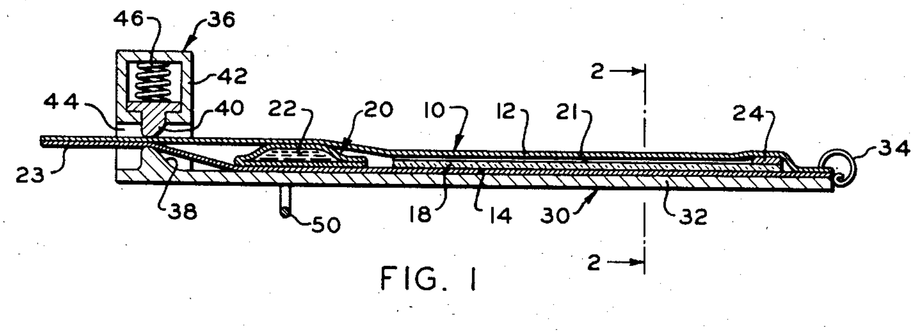
Figure 2:
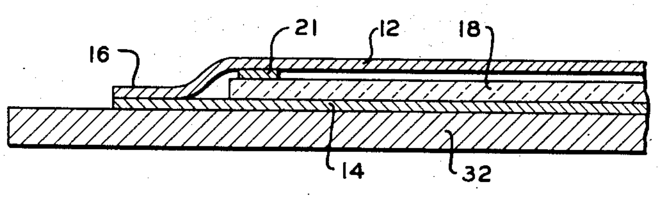

For a fuller understanding of the nature and objects of the invention, reference should be had to the following detailed description taken in connection with the accompanying drawing wherein:

Figure 1 is a sectional view of one form of structure embodying the present invention and suitable for use as a badge, the dimensions of portions of said structure being exaggerated for the purposes of clarity; and Fig. 2 is another sectional view taken along the line 2—2 of Fig. 1.

According to the present invention there is provided a novel radiation-sensitive device which includes as one component thereof a film unit sensitive to predetermined nuclear radiation and as another component the means for operatively mounting said unit and for processing the same to obtain a visible indication of the extent to which said unit has been exposed to said radiation. The film unit comprises a radiation-sensitive layer such as a silver halide emulsion, a pair of liquid-confining layers, one of which may be a support for the radiation-sensitive layer, a liquid-carrying container, a processing liquid in said container and a sufficient quantity of suitable reagents, said elements being so constituted and so related to one another that upon the application of a suitable mechanical stress to the unit, the liquid of the container is released to effect the processing of the radiation-sensitive layer so as to give a visible record of the extent of its exposure to radiation actinic thereto. In order to render the unit suitable for use in the detection of nonvisible radiation, the radiation-sensitive layer, which is usually also sensitive to visible light, is preferably enveloped by suitable light barrier layers which prevent visible light actinic thereto from reaching the same while passing the nonvisible actinic radiation which it is desired to record. One or both of these light barriers may be provided by the aforementioned liquid-confining layers. As another component, the novel composite structure of the invention includes a mounting means which not only supports the film unit in operative position for recording the presence of a predetermined type of radiation but also embodies suitable mechanism for subjecting the unit as it is removed from the mounting means to a mechanical stress which will process the unit to give a visible record of the radiation to which it has been subjected.

In general, the devices of the present invention are intended to detect the presence of radiation which may be characterized as nuclear radiation, being that radiation which is associated with X-rays, radium, uranium and other natural or artificial radioactive materials, and including corpuscular radiation i. e., beta and neutron radiation and photon radiation, the latter being generally of a wavelength of 120 angstroms or less.

Referring now to the drawings, there is illustrated, by way of example, one embodiment of the present invention in the form of a badge comprising a film unit 10 supported on a suitable mounting means 30, the latter being more fully described hereinafter. Film unit 10 comprises a pair of outer layers 12 and 14 which are preferably temporarily sealed together along their longitudinal marginal portions 16 and which have their other marginal portions either sealed together or held together by elements of said mounting means. Contained within the envelope thus formed by layers 12 and 14, and preferably mounted on one of said layers, for example layer 14, is a radiation-sensitive element 18 which comprises a suitable photosensitive emulsion layer, as for example a silver halide emulsion of the type used in industrial X-rays or one of the silver halide emulsions sensitive to beta and gamma radiation mentioned in the article "Instrumentation in the Field of Health Physics" by Carl Z. Morgan, reported on pages 74 to 82 of the January 1949 issue of the "Proceedings of the I R E." Element 18 may be an emulsion layer cast directly on layer 14 but is preferably of more conventional construction comprising a suitable film base upon which the emulsion is mounted. Photosensitive element 18 may also comprise a plurality of different emulsions arranged in strips to give areas of said element which are differently sensitive to the actinic radiation that is being recorded.

The layers 12 and 14 are preferably formed of paper opaque to visible light that is actinic to the emulsion of photosensitive element 18 while being transparent to the radiation of shorter wavelength whose presence is to be detected. In some instances, as for example when the so-called "color-blind" emulsions are used in element 18, it may be possible to form one or both of layers 12 and 14 from a sheet material that is transparent to that portion of the visible spectrum to which photosensitive element 18 is not sensitive. In such a case it becomes unnecessary after the photosensitive element has been processed to separate layers 12 and 14 in order to see the extent of exposure of the photosensitive element.

Also mounted within the envelope, formed by layers 12 and 14, is a suitable rupturable container 20 which carries a processing liquid 22 and which has its discharge mouth adjacent element 18. The container 20 is so constructed and arranged, relative to element 18, as to be capable, when suitable pressure is applied to the walls thereof, of releasing its contents to permeate layer 18, this liquid permeation acting to develop or otherwise process layer 18 to produce within the film unit a visible indication of the extent of exposure of layer 18. To insure the spreading of the liquid content of container 20 in a substantially uniform layer between element 18 and layer 12, there are mounted, adjacent the edges of said element 18, a pair of spacer strips 21, which strips extend substantially parallel to the direction in which the liquid is spread from container 20 to process element 18. A substantial length of layers 12 and 14 preferably projects beyond container 20 on the side thereof remote from element 18 to provide a leader portion 23 for film unit 10, permitting the unit to be manually held and pulled during processing.

The combination of the liquid-confining layers 12 and 14, radiation-sensitive element 18 and rupturable container 20, carrying a processing fluid 22, may be any one of the specific combinations shown and illustrated in detail in my copending application Serial No. 64,870, filed December 11, 1948, for Photographic Product Comprising a Rupturable Container Carrying a Photographic Processing Liquid (now Patent No. 2,543,181, granted February 27, 1951), and any one of the processes described in said application may be employed for the purpose of giving the visible indication of the degree of exposure of element 18 to radiation actinic thereto. In this connection it is to be noted that layer 12 may be provided with a white or lightly colored inner surface so as to be capable of receiving an image by transfer. Film unit 10 is also preferably provided with one or more suitable elements 24 which are located nearest the end thereof remote from container 20 and which act during the processing of unit 10 to provide a liquid-receiving space capable of trapping any liquid that is spread beyond the processed area of element 18.

As previously noted, mounting means 30 is provided to operatively mount film unit 10 and to process said unit whenever a record of the extent of its exposure to the invisible radiation actinic to element 18 is desired. In the form illustrated, said mounting means comprises a supporting plate 32 having at one end thereof a suitable resilient clip 34 which detachably engages and holds one end of film unit 10, pressing the marginal portions of walls 12 and 14 of said unit into light-tight engagement with one another. Mounted at the other end of plate 32 is a mechanism 36 for processing the film unit 10, which mechanism is provided with a processing passage through which the leader portion 23 of the film unit extends. The processing passage is defined by a pair of pressure-applying members 38 and 40, member 38 being mounted on or integrally secured to plate 32 while member 40 is mounted for relative movement towards and away from member 38 in a suitable housing 42. Housing 42 is supported at its ends by brackets 44 attached to the sides of plate 32 and within said housing there is provided one or more resilient elements, such as coil springs 46, for pressing pressure member 40 in the direction of element 38. A pair of shoulders, formed with or secured to member 40, are adapted to engage the walls of housing 42 to limit the movement of member 40 in the direction of member 38. A suitable clip or other securing means 50 is also affixed to plate 32 for attaching mounting means 30 to a person's apparel.

In operation, mounting means 30 is borne by its user so that film unit 10 thereof will be subjected to the action of any nuclear radiation incident upon the wearer. This radiation, if sufficiently intensive, activates the silver halide grains in element 18 to render the same developable. The number of grains which are rendered developable will, within limits, be a function of the amount of radiation to which the film has been subjected so that, by processing element 18 with suitable reagents including a developer, a record of this amount of radiation will be had. This record may be obtained either by just developing the emulsion of element 18 or, if a more permanent record is desired, by simultaneously developing and fixing said emulsion or by forming an impression by transfer upon the inner surface of layer 12.

Whenever desired, an indication of the amount of radiation to which the film unit has been subjected may be had merely by drawing film unit 10 through pressure-applying mechanism 36. Withdrawal of said unit between pressure-applying members 38 and 40 causes the contents of container 20 to be released and spread in a substantially uniform layer between the emulsion layer of element 18 and layer 12. As hereinbefore pointed out, the film unit contains suitable photographic ingredients, including at least a developer for silver halide, which ingredients are rendered effective upon the spreading of the liquid to at least develop the silver halide emulsion of element 18. The extent of development of said emulsion gives a visible indication of the amount of radiation to which the film unit has been exposed and may be observed by the user by peeling apart layers 12 and 14. Preferably, the reagents in the unit are selected so as to give a more permanent record of the extent of exposure and this may be accomplished by including reagents which develop and fix the photosensitive emulsion, or by including reagents which form, in accordance with the processes disclosed in my aforementioned application Serial No. 64,870, a transfer print of any latent image in the emulsion layer of element 18. The density of this transfer print will be an inverse function of the extent of exposure of the photosensitive element.

The terms "image," "latent image" and "transfer print," as used herein are understood to include within their scope the visible or latent records of a uniform exposure of the radiation-sensitive element to actinic radiation so that the visible image or print that is had is of a uniform density throughout its exposed area.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A device for intercepting, responding to and giving a visible indication of radiation to which the user thereof has been exposed, said device comprising a radiation-sensitive unit and means for mounting said unit and processing the same, said unit comprising a photosensitive layer responsive to said radiation, a pair of filter layers opaque to at least so much of the visible spectrum as is actinic to said photosensitive layer and transparent at least in part to said radiation, said filter layers forming an envelope for said photosensitive layer, and a rupturable liquid-carrying container within said envelope, said unit carrying photographic reagents in sufficient quanity to produce a visible record of the exposure of the photosensitive layer, said container being so located relative to said photosensitive layer as to be capable of releasing its liquid to permeate said layer, said liquid, when released from said container, rendering said reagents effective to form said visible record, said film unit including leader means, said mounting and processing means comprising a supporting member having a surface on which said unit is adapted to be seated, means carried by said member for detachable engagement with a portion of said unit when said unit is seated on said surface whereby to assist in releasably holding said unit on said surface, and a mechanism comprising a pair of superposed pressure-applying members mounted on said surface, said unit being engageable by and movable between said pressure-applying members and when seated on said surface having the leader means thereof extending through said pressure-applying members and engaged thereby whereby said unit is movable between said pressure-applying members by exerting a pulling force on the leader means of the unit which extend between the pressure-applying members, said pressure-applying members providing means, upon drawing the unit therebetween, for rupturing said container and releasing the contents thereof to permeate the photosensitive layer and to form in said unit a visible record of the extent of photoexposure of the photosensitive layer, said pressure-applying members also providing means cooperating with said means which are detachably engageable with a portion of the unit whereby said last-named means and said pressure-applying means hold said unit upon said surface in a substantially flat condition.

2. A device for intercepting, responding to and giving a visible indication of nuclear radiation to which the user thereof has been exposed, said device comprising a radiation-sensitive unit and means for mounting said unit and processing the same, said unit comprising a photosensitive silver halide layer photoresponsive to said radiation, a rupturable liquid-carrying container holding a processing liquid, and a pair of filter layers opaque to at least so much of the visible spectrum as is actinic to said photosensitive layer and transparent at least in part to said radiation, said filter layers being arranged in overlying relation and being releasably secured together to provide a relatively flat, quadrilaterally shaped and sealed envelope provided at one end with leader means for handling and processing said unit, said photosensitive layer and said container being mounted within the envelope provided by said overlying filter layers, said unit carrying photographic reagents, including a silver halide developer soluble in said processing liquid, in sufficient quantity to produce a visible record of the exposure of the photosensitive layer, said container being so located relative to said photosensitive layer as to be capable of releasing its liquid to permeate said layer, said liquid, when released from said container, rendering said reagents effective to form said visible record, said mounting and processing means comprising a supporting member having a surface on which said unit is adapted to be seated, means in the form of a resilient clip carried by said member for detachable engagement with the end of said unit furthest removed from said leader means when said unit is seated on said surface, and a mechanism mounted on said surface and spaced from said resilient clip for engagement with the leader means of said unit, said mechanism comprising a pair of superposed pressure-applying members engageable with the opposite sides of said unit and between which said unit is movable upon exerting a pulling force on the leader means of the unit which extend between the pressure-applying members, said pressure-applying members providing means for rupturing said container and releasing the content thereof to permeate the photosensitive layer and to form in said unit a visible record of the extent of photoexposure of the photosensitive layer upon drawing said unit through said pressure-applying members, said pressure-applying members and said resilient clip together providing means for releasably holding said unit flat upon said surface of said member.

3. The device of claim 1 wherein the supporting member is a plate and the means for detachably holding the film unit is mounted at one end of the plate and the mechanism comprising the pressure-applying members is mounted at the other end of the plate.

EDWIN H. LAND.

References Cited in the file of this patent

UNITED STATES PATENTS

| Number | Name | Date |
|---|---|---|
| 2,037,989 | Macklanburg | Apr. 21, 1936 |
| 2,387,887 | Dimsdale et al. | Oct. 30, 1945 |
| 2,435,717 | Land | Feb. 10, 1948 |
| 2,435,718 | Land | Feb. 10, 1948 |
| 2,467,320 | Land | Apr. 12, 1949 |
| 2,477,291 | Fairbank | July 26, 1949 |
| 2,483,014 | Land et al. | Sept. 27, 1949 |
| 2,483,991 | Wollan et al. | Oct. 4, 1949 |
| 2,495,112 | Wolff | Jan. 17, 1950 |
| 2,495,113 | Gannon | Jan. 17, 1950 |
| 2,496,218 | Kieffer | Jan. 31, 1950 |